Dec. 31, 1940. C. DE GANAHL 2,227,249
PORTABLE SEAM WELDER
Filed Jan. 5, 1939 3 Sheets-Sheet 1

INVENTOR
CARL deGANAHL
BY
Frank H. Borden
ATTORNEY

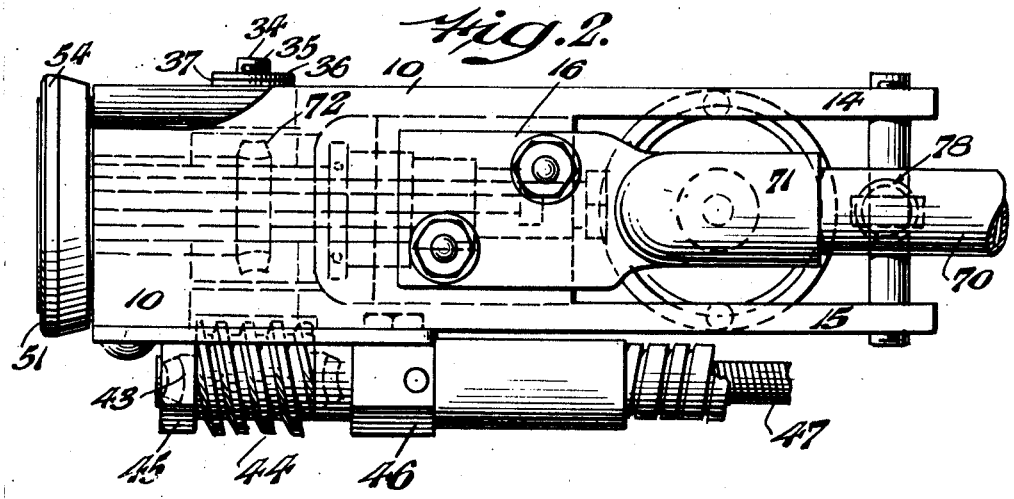

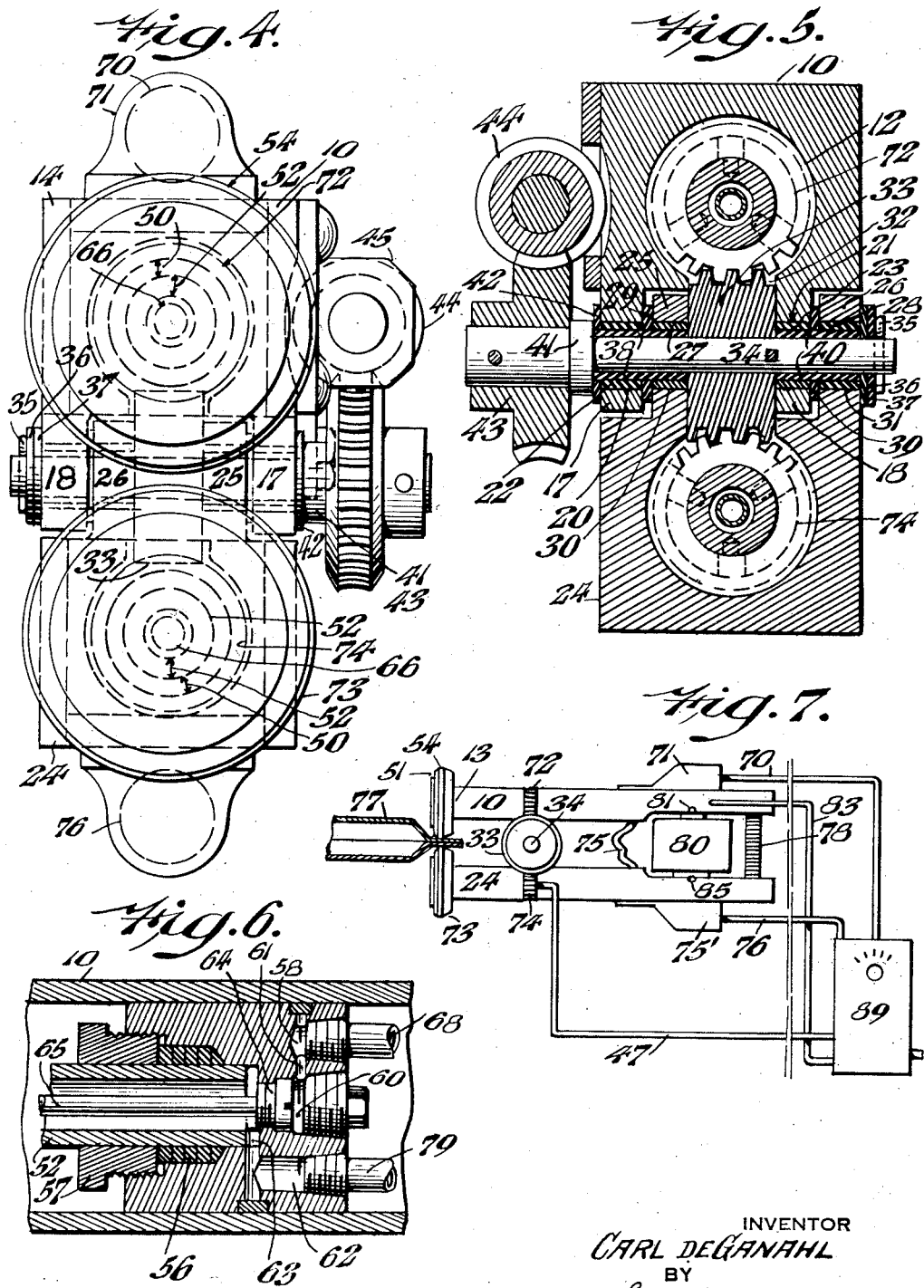

Patented Dec. 31, 1940

2,227,249

UNITED STATES PATENT OFFICE 2,227,249

PORTABLE SEAM WELDER

Carl de Ganahl, Bristol, Pa., assignor, by mesne assignments, to Reconstruction Finance Corporation Application January 5, 1939, Serial No. 249,405

9 Claims. (Cl. 219—4)

This invention relates to portable seam welders and particularly to welding devices for applying a plurality of spaced or overlapping spot welds to relatively stationary work.

Spot welding devices of the past have generally been rather large and heavy devices through which the work was fed, and in the known efforts toward portability have been handicapped by the limited range of relative motion between the work and welder, and by complications arising from the requirements as to cooling of the electrodes, suitably timing the welding surges, and providing suitable means to insure predetermined relative motion between the welder and work.

It is among the objects of this invention; to provide improvements in the art of portable welding devices;. to provide a portable seam welder using welding roller electrodes with the rollers geared for synchronous actuation; to provide a portable welder having driven roller electrodes in which the axis of a driven member is a hinge axis about which the roller electrodes may be relatively adjusted to admit and withdraw the work; to provide a portable welder in which a pair of driven electrodes are water cooled in series; to provide a portable welder in which a pair of roller electrodes are coupled about a pivot perpendicular to the plane containing the axes of the roller with a fluid pressure device operative about said pivot for forcing the roller edges toward each other to embrace the work; to provide a portable welder having a pair of electrodes movable from and toward each other about a pivot, with resilient means effective on one side of the pivot for urging the electrodes apart, with fluid pressure means effective on the same side of the pivot for forcing the electrodes together; to provide a portable seam welder comprising a pair of roller electrodes which are water cooled in series but which are electrically insulated to prevent short circuiting of the welding current; to provide in a portable welder a pair of rotatable roller electrodes insulatedly pivoted together on a transverse axis with insulating-gear means driven on an axis coincident with said pivot for simultaneously driving said roller electrodes and insulating one from the other and many other objects and advantages will become more apparent as the description proceeds.

In the accompanying drawings forming part of this description,

Fig. 2 represents a bottom or reflected plan of the welder of Fig. 1.

Fig. 3 represents a side elevation of the same.

Fig. 4 represents an end elevation thereof.

Fig. 5 represents a transverse vertical section on line 5—5 of Fig. 1.

Fig. 6 represents a fragmentary section on line 6—6 of Fig. 1.

Fig. 7 represents a diagram of the welder and work and the operating and control system therefor.

Figure 1:
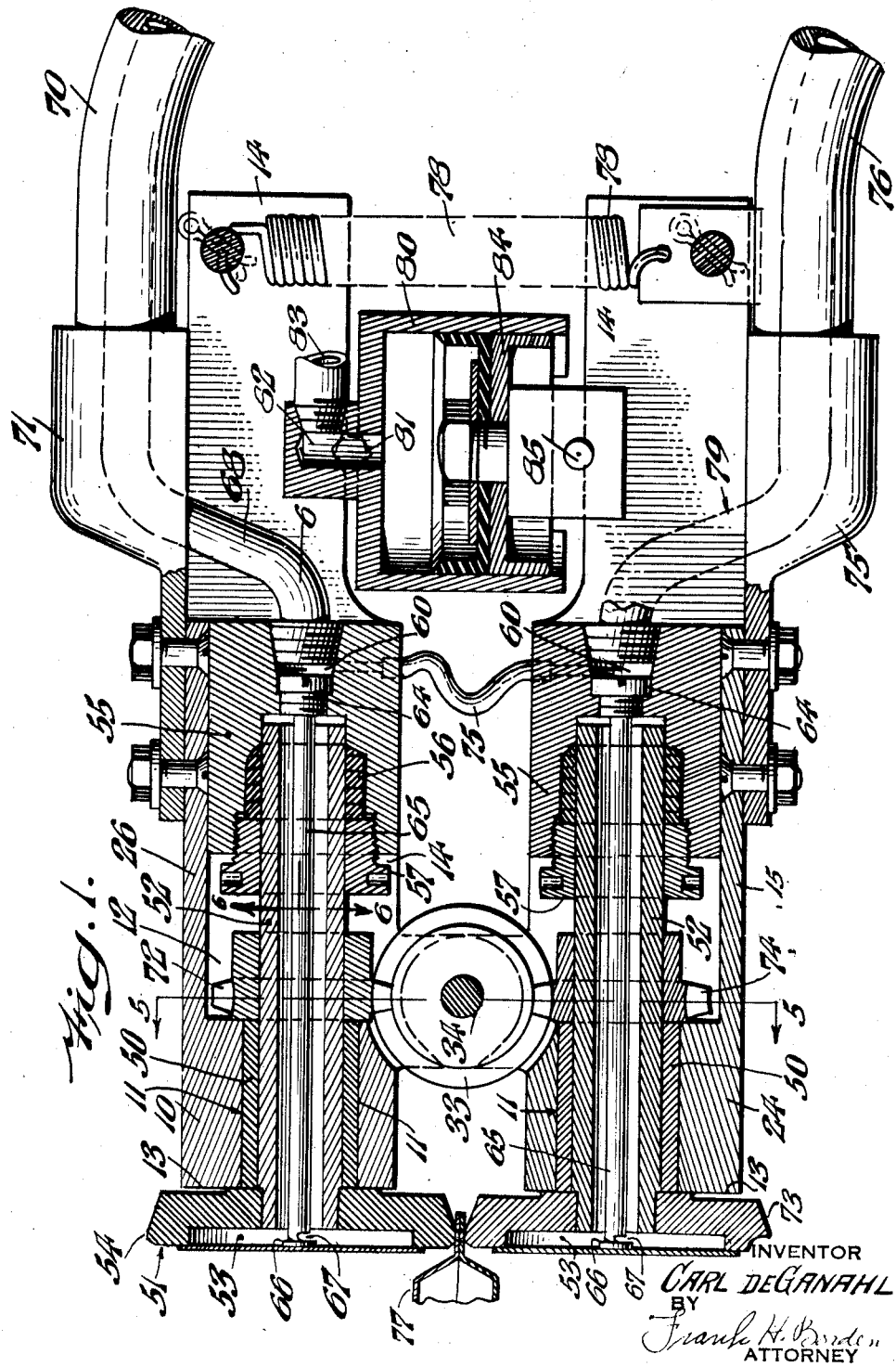
Fig. 1 represents a longitudinal section partially in elevation of a preferred form of the portable seam welder.

In the illustrative form of the device illustrated in Fig. 1, a frame-work or supporting member or arm 10 has a longitudinal bore 11 leading to an enlarged recess 12 at one end and to a face end 13 at the other. The frame-work 10 at the rear end has spaceed side walls 14 and 15 joined by the web surface 16 and terminating toward the roller end in the parallel spaced ears 17 and 18 having the respective aligned apertures 20 and 21, respectively containing the insulating bushings 22 and 23 and extending asymmetrically from the frame-work 10 as shown in Fig. 5. This comprises one half of the supporting frame-work, which, with a complemental frame element 24, substantially identical to, but reversed in its relation to the first mentioned described framework 10, forms the complete welding assembly. The second frame-work 24, having the side members and webs described relative to member 10, has the asymmetrically disposed laterally projecting lugs or ears 25 and 26, each provided with the insulating bushings respectively 27 and 28, in aligned apertures 30 and 31. The ears of frame 24 are arranged in staggered overlapping relation to the ears 17 and 18 of frame 10 so that the apertures in all four ears are in alignment with an enlarged concentric median space 32 between the adjacent oppositely extending middle ears. The space 32 is provided to receive the insulating worm gear 33 rotatable between contiguous ears 18 and 25 and keyed to a shaft 34, one end of which extends beyond one side ear 26 to anchored engagement, as by a cotter pin 35 or the like, bearing upon a plate 36 insulated from metallic ear 26 by an insulating washer 37. Shaft 34 carries the insulating sleeves, respectively 38 and 40, on each side of gear 33, within which it is journaled, and on its driven end has a flange or shoulder 41 engaging an insulating washer 42 adjacent to the ear 17. Additional insulating washers 29 and 39 electrically insulate adjacent ears from each other.

The shaft 34, externally of the flange 41, carries the driven worm pinion 43, keyed to the shaft and continuously in mesh with the longitudinally extending worm gear 44, journaled insulatedly in bearings 45 and 46, mounted on the side wall 15 of frame member 10. The worm gear 44 is driven by flexible shaft 47 of any desired length leading to a power source (housed in the control assembly 89, Fig. 7) remote from the portable welder, so as to enable manual manipulations of the welder while maintaining torque upon shaft 47 and worm gear 44. It is to be understood that frames or arms 10 and 24 are both pivotally connected together upon an axis substantially concentric with that of the drive shaft 34 but in mutually insulated electrical relation to each other.

The bore 11 in frame 10 contains a bushing 50, in which the roller electrode 51 is journaled for rotation. The electrode may be formed in any desired manner but preferably is internally water cooled and comprises a hollow tubular shank 52 and the hollow or recessed end 53, with the recess being in communication with the interior of the shank 52. The electrode has a welding periphery 54. The hollow shank extends through the front face 13 of the frame 10, rotatably in bushing 50, across the space 12 and into the cast block 55. The latter contains the packing gland 56 and the adjustable nut therefore, 57, and has the internal bores 58 and 60 for the water supply, communicating through channel 61, and also contains the bore 62 for the water exhaust communicating, through cross bore 63, with the interior of the rotatable hollow shank 52 as it rotates. The central bore 60, which is suitably partially blocked or plugged, contains the threaded terminal flange 64 of the water supply, carrying reduced tube 65 disposed within the shank 52 and leading to a spray head in the recess 53, preferably comprised of a disc terminal 66 and the arcuate slot 67 adjacent thereto. The water intake aperture 58 communicates with a suitable tube 68 leading to the water supply passing to the welder through the hollow flexible electrical and water conductor 70 through the internally ported terminal block 71. The water supply preferably emanates from the timer and control assembly 89.

The roller electrode 51 is in constant mesh with the insulating worm 33, through a worm pinion gear 72 keyed or splined to the tubular shaft 52. Note that the drive is constant regardless of the relative pivoted relationship of the components or arms of the welder about the axis of shaft 34.

The other portion of the frame, the complemental support element 24, carries a complemental roller electrode 73 driven by worm pinion gear 74, also in mesh with the insulating worm gear 33, and similar in all respects to the rolling electrode just described. The cooling system however is, preferably in series with that just described. To this end a flexible conduit 75 leads from the exhaust bore of roller electrode 51, into the intake port of the water supply for the roller electrode 73. The exhaust from roller electrode 73 leads by conduit 79 into the internally ported terminal box 75' and thence into the tubular flexible electrical and water connector 76 to return to the timer and control assembly 89.

It will be understood that the respective hollow electrical conductors or connectors 70 and 76 lead to a suitable welding transformer and timing device 89 of any conventional type, by which a variably timed succession of welding impulses enter the welder through connector 70, terminal box 71 and through the frame 10 to the roller electrode 54, and, if the latter has been moved into welding engagement with the work 77, they fuse or weld the work 77, and pass through cooperating complemental roller electrode 73, and through frame 24, terminal box 75' and connector 76 back to the transformer. The timer transformer and control assembly 89 preferably houses a motor (not shown) to drive the flexible shaft 47 with variable speeds and contains valves and the like for water and air supplies.

On the opposite side of the pivot 34 from the peripherally engageable welding rollers is the tension spring 78 tending to urge the welding rollers apart about the fulcrum 34, so as to effect quick release of the work and to maintain the jaws (formed by the two welding rollers) normally open. On the same side and adjacent to the spring preferably further from the pivot axis 34 than the juxtaposed rollers, so as to exert great power, is the power cylinder 80, connected to frame 10 through any suitable support such as the transverse pivot member 81, and having the intake port 82 and air conduit 83 leading therefrom. A piston 84 slidable in the cylinder 80 is pivoted to the frame 24 at point 85, and the whole is so arranged that air pressure from a suitable source (not shown) but illustratively disposed in the power housing 89 passing through a suitable control mounted on the portable welder (not shown) and arranged under the control of the operator, regulates the entry and exhaust of compressed air or other fluid into and out of the cylinder above the piston, to force the spring-held ends of the frame apart and to force the roller peripheries together about the axis 34 to engage work 77 with suitable welding pressure.

It will be understood that the water supply will be suitably led into and conducted away from the respective connectors 70 and 76 at points remote from the welder (and preferably through the timer controller) in order to reduce the number of flexible connectors leading from the welder. It will be understood of course that independent leads for the water supply may be provided, independent of the electrical connectors.

The advantages of the invention, the fact that it can be caused to firmly engage the work with a rolling grip or clamp action, and that the work and welder will be relatively driven through torque on the concentric insulating worm gear driving both electrodes, with a positive movement, while the welding impulses may be provided in either overlapping or spaced relation as desired will be apparent. It will be recognized that it may not be always necessary or desirable to drive both roller electrodes and one may be independently journaled, to serve as an idler, if for any reason this should be sought.

Obviously many other changes may be made in the invention without departing from the spirit thereof, and such changes are to be construed as within the scope of the invention, except as the appended claims may be otherwise expressly limited.

I claim as my invention:

1. A portable welder comprising a pair of arms, means electrically insulating the arms, a hollow roller electrode mounted on a hollow spindle journalled in each arm, means connecting the arms pivotally between the ends of the respective hollow spindles with the periphery of both rollers in a substantially common plane parallel to the pivotal axis when in juxtaposition so that work passes through the juxtaposed rollers substantially parallel to the pivotal axis, and means conducting cooling fluid to the interior of each electrode.

2. A portable welder comprising a supporting arm, a roller electrode journalled in the arm, a second arm, a second roller electrode journalled in the second arm, means pivoting the arms together in electrically insulated relation, a worm gear concentric with the pivot of the arms, a worm pinion gear keyed to one of the rollers in mesh with the worm gear, and means for driving the worm gear.

3. A portable welder comprising a frame, a second frame pivoted thereto, a hollow roller electrode mounted on a hollow spindle journalled longitudinally in the frame perpendicular to the axis of said pivot, a second hollow roller electrode mounted on a hollow spindle journalled longitudinally of the second frame perpendicular to the axis of said pivot, means urging the frames together about the pivot, gears engaging each hollow spindle, a driven member in mesh with each of said gears in two different positions of adjustment of said frames about said pivot, power means for urging the frames apart about the pivot to force the rollers toward each other, means conducting cooling fluid to one hollow spindle, means for conducting cooling fluid away from the said hollow spindle and means conducting fluid from one spindle to the other.

4. A portable welder comprising a hollow roller electrode, a second hollow roller electrode, means for journalling the rollers for rotation, means pivoting the electrodes together, means forcing the rollers toward each other about said pivot, means establishing a circuit of cooling water in series through the rollers, means concentric with the said pivot for imparting torque to both electrodes in various adjusted relations of said pivot.

5. A portable welding device comprising a frame having pivoting apertured ears close to one end, a roller electrode journalled longitudinally of the frame in said end transversely of the line of the apertures in said ears, a complemental frame having complemental apertured ears close to one end, a complemental roller electrode longitudinally journalled in said last mentioned end transversely of the line of the apertures in the last mentioned ears, a pivoting device extending through the apertures in the respective ears, the rollers being disposed in close but adjustable adjacency, a worm gear mounted on the pivoting device, a pinion gear in mesh with the worm gear and keyed to one roller electrode, means for driving the worm gear, and power means on the other side of said pivot further from said pivot than said rollers to force said rollers toward each other about the pivot.

6. A portable welder comprising a supporting frame, a roller electrode having an axis and journalled in the frame, a complemental frame, a complemental roller electrode having an axis and journalled in the complemental frame, means pivoting the frames together for relative pivotal motion on an axis substantially perpendicular to a plane containing the axes of both rollers, means insulating the electrodes apart, a worm gear journalled concentrically of the pivot for the frames, pinion gears in constant mesh with said worm and respectively in driving relation to the respective roller electrodes, at least one of the said gears being formed of insulating material to assist in insulating the electrodes apart, and means for driving said worm gear.

7. A portable welder comprising a supporting frame, a roller electrode having an axis and journalled in the frame, a complemental frame, a complemental roller electrode having an axis and journalled in the complemental frame, means pivoting the frames together for relative pivotal motion on an axis substantially perpendicular to a plane containing the axes of both rollers, means insulating the electrodes apart, worm pinion gears keyed to each roller, a worm gear in mesh with the pinion gears and concentric with said pivot, and means for driving said worm gear.

8. A portable welder comprising a supporting frame, a roller electrode having an axis and journalled in the frame, a complemental frame, a complemental roller electrode having an axis and journalled in the complemental frame, means pivoting the frames together for relative pivotal motion on an axis substantially perpendicular to a plane containing the axes of both rollers, means insulating the electrodes apart, means conducting a welding current to the respective electrodes, a worm gear of insulating material journalled concentrically of the pivot for the frames, metallic pinion gears in constant mesh with and insulated apart by the worm gear and keyed respectively to the respective roller electrodes, and means for driving said worm gear.

9. A portable welder comprising a supporting frame, a roller electrode having an axis and journalled in the frame, a complemental frame, a complemental roller electrode having an axis and journalled in the complemental frame, means pivoting the frame and complemental frame together about an axis substantially perpendicular to a plane containing the axes of the roller electrodes comprising a drive shaft, means insulating the frame and complemental frame from the shaft, a gear on the shaft insulated from the frames, and pinion gears keyed to the respective rollers and in mesh with the first mentioned gear to drive said rollers.

CARL DE GANAHL.